June 30, 1959 J. McAFEE 2,892,772
TRANSFER OF FLUIDIZED SOLIDS
Filed Dec. 29, 1953 2 Sheets-Sheet 1

INVENTOR.
Jerry McAfee
BY
ATTORNEYS

June 30, 1959

J. McAFEE 2,892,772

TRANSFER OF FLUIDIZED SOLIDS

Filed Dec. 29, 1953

INVENTOR.
Jerry McAfee.
BY
ATTORNEYS

United States Patent Office 2,892,772
Patented June 30, 1959

2,892,772

TRANSFER OF FLUIDIZED SOLIDS

Jerry McAfee, Oakmont, Pa., assignor to Gulf Research & Development Company, Pittsburgh, Pa., a corporation of Delaware Application December 29, 1953, Serial No. 401,011

11 Claims. (Cl. 208—164)

This invention relates to processes in which finely divided solid particles are suspended in a fluid bed by a stream of gases which hinder settling of the particles and more particularly to the transfer of thus fluidized solid particles between two vessels in a cyclical process.

In processes using the fluidized solids technique to obtain intimate contact between the solid particles and a gaseous phase, finely divided solid particles are suspended in a reaction vessel by an upwardly flowing gas in a condition of hindered settling to form a fluid dense phase of solid particles. The dense phase of solid particles resembles a boiling liquid in appearance, being extremely turbulent with bubbles of gas rising through the dense phase, and, when the dense phase does not fill the entire vessel, having a well defined upper level or surface above which some particles are normally entrained in a dilute phase by the ascending gas.

The fluidized technique is particularly advantageous in processes in which the solid particles are subjected to one atmosphere and set of reaction conditions in a first vessel and a different atmosphere and set of reaction conditions in a second reaction vessel, and the solid particles are transferred alternately from one vessel to the other. Frequently the purpose of transferring the solid particles from one vessel to another is to heat the particles in one vessel and thereby transfer heat with the fluidized particles to the other vessel. In other instances, notably fluid catalytic cracking processes, solid catalyst particles are transferred from a reactor to a regenerator in which the activity of the catalyst is restored, and then back to the reactor. In still other processes, the fluidized solid particles may be one of the ractants, and are consumed and replaced during the process.

The driving force for circulating the finely divided solid particles between the two vessels is usually the "static" head developed by a column of dense phase, fluidized particles in a standpipe. The particles are discharged from the lower end of the standpipe into a transfer gas which then carries the particles in a dilute phase to the other vessel. Slide valves at the bottom of the standpipe control the rate at which the fluidized particles are discharged from the standpipe.

The slide valves are a source of considerable expense and difficulty in the operation of a fluidized process. A stream of solid particles passing at a high velocity through the slide valve frequently causes severe erosion of the valve, particularly if the solid particles are hard and of an abrasive nature. Similarly, it is often difficult to obtain a valve that will satisfactorily withstand high temperatures or corrosive conditions that are present in many reactions. Moreover, the pressure drop through the slide valves increases the height of the standpipe required to obtain the head necessary for the desired flow rates and thereby increases the steel requirements and costs of the equipment.

In many processes employing the fluidized solids technique, it is necessary to transfer large volumes of solids between the two reaction vessels. The low concentration of solids in the dilute phase makes large volumes of transfer gas traveling at high velocities necessary to transfer the solids from one vessel to the other. Thus, transfer of the fluidized solid particles in a dilute phase requires large transfer lines which are often subjected to serious erosion as a result of the high velocities of the dilute phase mixture of gas and solid particles.

Vertical standpipes, or standpipes supported at a small angle with the vertical, extending from one reaction vessel to another reaction vessel at a lower level have been suggested to avoid the difficulties encountered with the operation of slide valves. With this arrangement the fluidized solid particles move by gravity directly from the dense phase of the higher reaction vessel into the dense phase in the lower. Return of the solid particles from the lower reaction vessel to the upper vessel is accomplished by withdrawing the fluidized particles from the dense phase of the lower vessel into a transfer line, introducing an aeration gas into the transfer line to reduce the density of the fluidized system therein, and returning the withdrawn particles to the upper reaction zone. It is apparent that there is a very delicate balance between the pressure in the two vessels, the density of the fluid bed in the reactors and the less dense phase in the transfer lines in this apparatus. Thus, the range of operability is very narrow. If the aeration gas introduced into the return transfer line is greatly increased to increase the driving force available for circulating the solids, the disadvantages of transferring the solid particles in a dilute phase are encountered.

This invention resides in a process and apparatus for transferring fluidized solid particles alternately from a first reaction vessel to a second reaction vessel and back from the second reaction vessel to the first by changing the relative pressures in the two vessels to cause periodic reversal of the direction of flow of fluidized solid particles between the two vessels. A transfer line is maintained open to flow into the dense phase of fluidized particles in each of the vessels to permit flow of the fluidized particles from the vessel at the higher pressure to the vessel at the lower pressure at all times.

This invention may be employed in a wide variety of fluidized process in which solid particles are transferred cyclically from one reaction vessel to another, regardless of whether the solid particles act as a reactant, a catalyst, or merely a heat transfer medium. The method of transfer of fluidized solid particles comprising this invention is especially valuable for reactions performed at high pressures. In most high pressure processes, the pressure differential between the two vessels will be only a very small percentage of the total pressure on the vessels in order to allow transfer of the fluidized solid particles without requiring standpipes of excessive height. Very small percentage variations of the total pressure in either vessel will cause large percentage variations in the pressure differential, and, as a result, large variations in the rate of flow between the two vessels would occur in the conventional fluid units.

The fluidized solid particles may have a particle size ranging ordinarily from 0 to 1000 microns and more commonly from 0 to 200 microns. The particles, which may be either a finely ground powder or in the form of microspheres, are suspended in a dense phase, hindered-settling state within the reaction vessels by ascending reaction or fluidizing gases. The density of the dense phase may vary widely, depending upon the rate of flow of the fluidizing gases and the density of the particular solid particles. Typical dense phase densities of fluidized catalytic cracking catalysts are of the order of 15 to 35 pounds per cubic foot.

The process for the transfer of fluidized solid particles comprising this invention is not limited to a process involving any particular type of chemical reaction, but is, in general, suitable for any process using the fluidized technique. For example, the invention may be used in such processes as the catalytic conversion of hydrocarbons, such as cracking and reforming of petroleum hydrocarbons, the hydrodesulfurization of heavy residual petroleum oils, hydrogenation processes, the coking of coals and residual oils, and the manufacture of synthesis gas. The reactions are listed above merely for illustration of some types of reactions with which this invention may be employed and in no way limit the application of this invention. Reactions in which this invention is especially advantageous are those in which prolonged contact of the gases with the solid particles will not cause undesirable side reactions; hence, variations in the depth of the fluidized bed and the amount of solid particles in the reactor above the minimum for substantial completion of the reaction have little effect on the yield or quality of reaction products.

Figure 1:
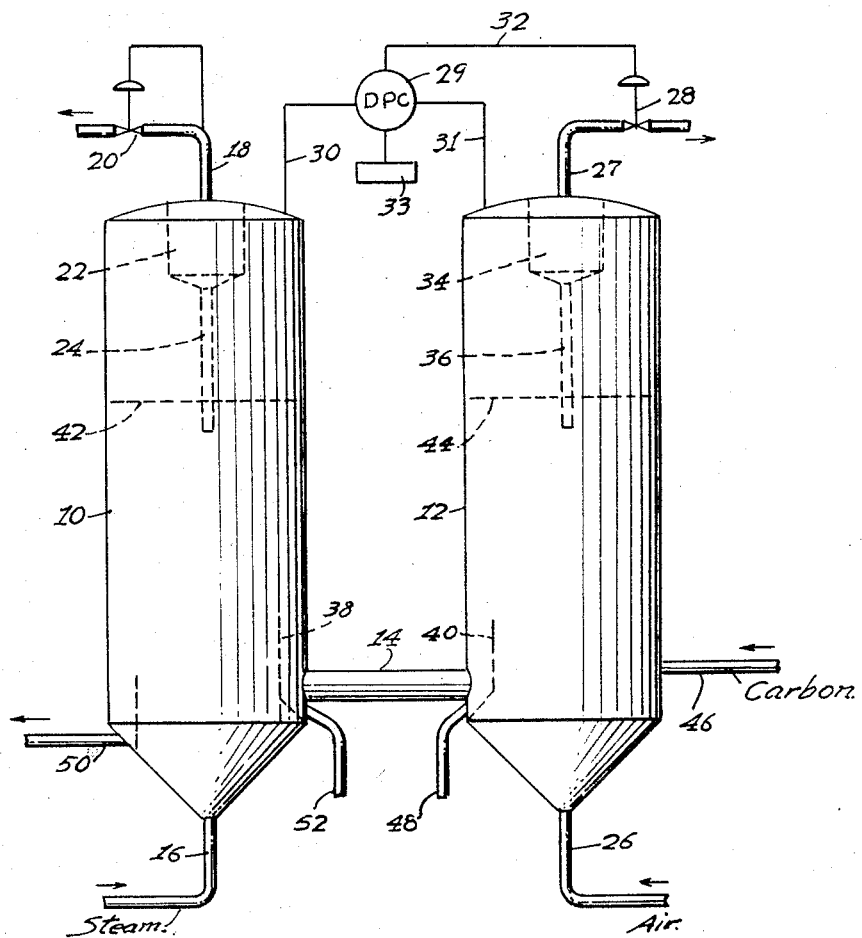
Figure 1 is a diagrammatic flow sheet of an embodiment of this invention employed in the manufacture of water gas.

In order to illustrate the application of this invention to a specific process, this invention will be described in connection with the manufacture of water gas. Referring to Figure 1 of the drawings, two reaction vessels are illustrated, one being designated as a reactor 10 and the other a heater 12. The vessels are connected by an open transfer line 14 which opens into the lower portion of each of reactor 10 and heater 12. The reactor 10 is provided with a steam inlet line 16 at its lower end and an outlet line 18 for discharging reaction gases from the reactor at its upper end. A pressure control valve 20 in the outlet line 18 permits regulation of the pressure on the reactor.

The outlet line 18 is illustrated as communicating directly with a cyclone separator 22 which is shown mounted within the reactor 10. Separator 22 may be supported outside of the reactor and provided with suitable connections with the reactor 10 and the outlet line 18, if desired. A dip line 24 for returning solid particles separated in the separator 22 to the fluid bed within the reactor extends downwardly from the separator 22.

Heater 12 is provided with an air inlet line 26 at its lower end and a flue gas outlet line 27 at its upper end. A pressure control valve 28 is provided in the outlet line 27 for control of the pressure in the heater. A differential pressure controller 29, connected to reactor 10 and heater 12 through pressure taps 30 and 31 actuates valve 28 through connection 32. The differential pressure controller 29 receives a signal from a timer 33 for reversing the direction of the pressure differential, as will be described later.

Mounted within the heater 12 is a cyclone separator 34 having a dip leg 36 extending down to a lower level in the heater 12 for return of solid particles separated from the gases leaving the reactor to the fluid bed. As in the case of the cyclone separator 22, cyclone separator 34 may be supported outside of the vessel. In some instances, it may be desirable to extend the dip leg 36 from the cyclone separator 34 to discharge outside of the heater 12 in order to remove ash from the system.

The reactor 10 and the heater 12 may be provided with internal baffles 38 and 40 positioned over the openings of the transfer line 14 into the two reaction vessels to prevent the entrance of bubbles of reaction gases from the reaction vessels directly into the transfer line.

A dense phase fluid bed of solid particles of carbon is maintained in each of the reaction vessels 10 and 12. In the case of reactor 10, the solid carbon particles are maintained in the fluidized state in a fluid bed, having an upper surface indicated by reference numeral 42, by an ascending stream of steam, which is introduced into the bottom of the reactor through line 16, and gaseous products from the reaction of the steam with the carbon particles. Similarly, an ascending stream of air introduced through line 26 into the lower end of the heater 12 maintains a fluid bed of carbon particles having an upper level indicated by reference numeral 44 in the heater 12.

Finely divided carbon particles having a suitable particle size are introduced through line 46 into the fluid bed in the heater 12 and are heated by combustion and by mixing with the hot constituents of the fluid bed to the reaction temperature in the heater 12, which ordinarily will be within the range of 1800° to 2500° F. The combustion products pass through separator 34 in which entrained solid particles are separated from the flue gases which are then discharged through line 27 to a stack, not shown. The pressure on the heater is adjusted by means of control valve 28. Ordinarily in the water gas reaction substantially atmospheric pressures, for example, up to about 75 pounds per square inch, will be employed.

After a predetermined period for combustion has been completed, which period may be governed by the temperature in the heater 12, the timer 33 actuates differential pressure controller 29 which partially closes valve 28 and thereby increases the pressure on the heater 12. When a pressure higher than the pressure in the reactor 10 is reached, fluidized carbon particles pass between the baffle 40 and the wall of heater 12, through the transfer line 14, and into the reactor 10. The baffle 40 limits gases transferred from the heater 12 to the reactor 10 to those entrained with the flow of fluidized solid particles which will be relatively small in amount as compared with the amounts present in ascending bubbles of gas. If desired, the fluidized particles descending between baffle 40 and the wall of the reactor may be stripped of entrained reaction gases, as well as aerated, by means of an inert gas introduced into heater 12 through line 48. After transfer of the desired quantity of carbon particles, timer 33 sends a signal to the differential pressure controller 29 which opens valve 28 to halt the transfer from heater 12 to reactor 10. Ordinarily the period of transfer from one vessel to the other will be relatively short to transfer only a small percentage of the particles in the reactors and thereby maintain substantially uniform operating conditions within the reactors.

The steam introduced into reactor 10 through line 16 reacts with the incandescent solid particles delivered into the reactor through the transfer line 14 to form a gaseous mixture which is largely carbon monoxide and hydrogen. The gaseous reaction products pass through separator 22 into outlet line 18 and are discharged through that line to storage or recovery equipment, not shown. Solid carbon particles entrained with the gaseous reaction products leaving the fluid bed in reactor 10 are returned through the dip line 24. In some instances it may be necessary to discharge a stream of solid particles from the reactor 10 to prevent accumulation of ash in the reaction vessels and a solid particle outlet line 50 is provided for this purpose.

The reaction of steam with incandescent carbon particles is strongly endothermic and the continued introduction of steam into reactor 10 will result in a decrease in the temperature in the reactor to a temperature too low for the water gas reaction. Hence, it will be necessary to transfer solid particles back to the heater 12 to heat them to a high reaction temperature periodically. This is accomplished by the timer 33 actuating differential pressure controller 29 to open pressure control valve 28 and thus decrease the pressure on the heater 12 below the pressure on reactor 10. Fluidized solid particles then flow through transfer line 14 into heater 12 where they are again heated by combustion to a temperature suitable for the water gas reaction and the cycle is repeated. If desired, an inert gas may be introduced through line 52 to strip the solid particles of entrained gases.

It will be clear that the length of the cycle will be determined by the characteristics of the reactions taking place in the reaction vessels. If the reaction in one vessel is highly endothermic, frequent reversals of flow will be required to supply heat to that vessel. The water gas reaction is described as a reaction of that type. In some instances, however, the reaction in one of the vessels may be substantially self-supporting as far as heat requirements are concerned and may cause little contamination of the solid particles, in which event the periods between reversal of flow in the transfer line may be long.

In the water gas reaction the depth of the fluid bed of carbon particles in reactor 10 is not critical as long as the bed is sufficiently deep to permit substantial completion of the reaction between the steam and carbon particles. The intermittent flow of solid particles to and from the reactor 10, with the resulting rise and fall in the level 42, has no adverse effect on the composition of the reaction products.

Figure 2:
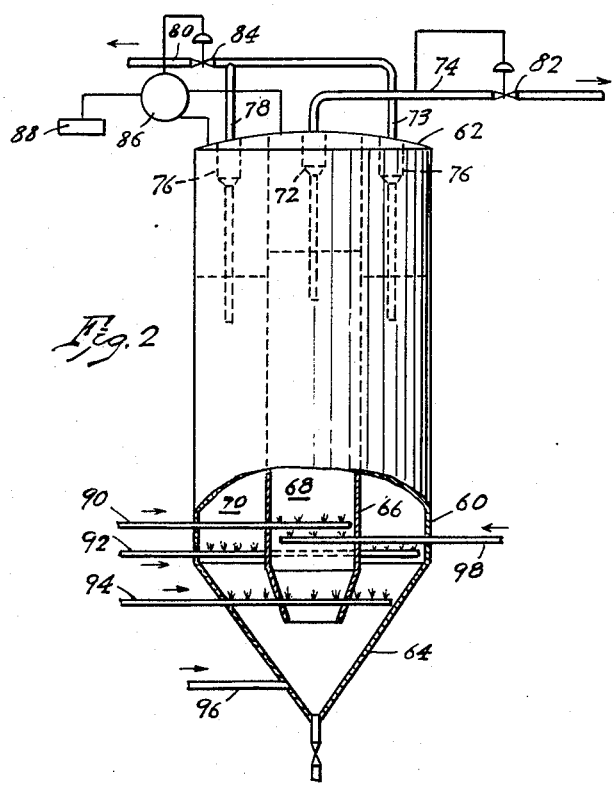
Figure 2 is a diagrammatic illustration of an embodiment of apparatus for use in this invention in which one of the reactors is supported within the other.

The two vessels between which fluidized solid particles are transferred according to this invention may be arranged concentrically, as shown in Figure 2, which is described as used for a process for the hydrodesulfurization of residual petroleum oils in the presence of a fluidized catalyst. In that embodiment of the invention, an outer shell 60 is closed at its upper end with a cover plate 62 and at its lower end by a conical bottom member 64. An inner shell 66 is secured to and extends downwardly from the inner surface of cover plate 62. Inner shell 66 terminates at its lower end short of the bottom member 64. Thus, inner shell 66 and outer shell 60, together with cover plate 62 and bottom member, define a concentrically arranged reactor 68 and regenerator 70 which are in open communication at their lower ends. The positions of the reactor and regenerator may be reversed, and in some instances it is preferred that the reactor surround the regenerator.

A separator 72 in the upper end of the reactor 68 is adapted to separate entrained catalyst particles from reaction products and discharge the reaction products into an outlet line 74 for discharge from the system. Similarly, separators 76 in the regenerator 70 are provided to separate catalyst particles from the flue gases discharged into outlet lines 78 which join a single flue gas line 80.

Instrumentation for control of the pressure on the reactor 68 and regenerator 70 is similar to the instrumentation illustrated in Figure 1. A pressure control valve 82 in line 74 controls the pressure on the reactor. A pressure control valve 84 in line 80 is operatively connected with a differential pressure controller 86 actuated by a timer 88 and the pressure in the reactor 68 and regenerator 70 to control the pressure in the regenerator.

A residual oil feed line 90 opens into the reactor 68 above the bottom of the inner shell 66, and an oxygen-containing gas line 92 opens into the regenerator 70, also above the bottom of the inner shell. A stripping gas line 94 opens into both reactor 68 and regenerator 70 below the level of lines 90 and 92. The stripping gas may be any inert gas, for example, steam. Fluidizing gas is introduced into the lower portion of the bottom member 64 through a line 96. Hydrogen-containing gas is introduced into the reactor 68 through a hydrogen line 98, preferably located between lines 90 and 94.

A fluid bed of finely divided particles of a hydrogenation catalyst is maintained in reactor 68 and regenerator 70. By "hydrogenation catalyst" is meant those catalysts which are conventionally used for the hydrogenation of petroleum hydrocarbons. Examples of such catalysts are the iron group metals, the iron group metal oxides either singly or in combination, the Group VI metals such as molybdenum or tungsten and compounds of the Group VI metals such as the oxides or sulfides of those metals. The above list of catalysts is only an illustration of some of the catalysts which may be employed and obviously this invention is not dependent on, or limited to, any particular type of catalyst.

In operation, a residual oil, such as 17–20% bottoms of a Kuwait crude, to be hydrodesulfurized is introduced into the dense phase within the reactor 68 through feed line 90. A hydrogen-containing gas is introduced through line 98 into the reactor in quantities of 1000 to 20,000 cubic feet per barrel of charge and passes upwardly through the fluid catalyst bed at a velocity usually ranging from 0.05 to 3.0 feet per second. The temperature within the reactor is maintained within the range of about 750° to 950° F., and the pressure is in the range of 250 to 2500 p.s.i. and more desirably 500 to 1000 p.s.i. An inert gas, which ordinarily is steam, is introduced through line 96 to maintain the catalyst in the lower portion of the reactor in a fluidized condition. Reaction products resulting from the contact of the hydrocarbons at high temperatures with the catalyst are discharged from the upper surface of the fluid bed within the reactor 68 and pass through the separator 72 and outlet line 74 to recovery equipment. Catalyst particles separated from the reaction products are returned through the dip leg of the separator to the fluid bed within the reactor.

The hydrodesulfurization reaction is neither highly endothermic or exothermic and hence the amount of heat which must be either supplied to or removed from the reaction is relatively small. Moreover, the amount of cracking that occurs within the reactor 68 is limited and as a result contamination of the catalyst with deposits of coke is not severe. As a result, the reactor may be maintained at operating conditions giving satisfactory yields of reaction products for relatively long periods before transfer of catalyst to the regenerator is necessary.

Transfer of catalyst from the reactor 68 to the regenerator 70 is accomplished by timer 88 actutating differential pressure controller 86 which opens valve 84 further. The pressure on regenerator 70 is thereby decreased and fluidized catalyst particles move downwardly in reactor 68, under the lower edge of inner shell 66, and then upwardly into regenerator 70. The turbulent condition of the fluid bed of catalyst particles in the regenerator 70 mixes the recently transferred particles with the other particles in the fluid bed.

After the desired quantity of catalyst has been transferred to the regenerator 70, which quantity is ordinarily only a small fraction of the total catalyst in the reactor 68 to allow the maintenance of a substantially uniform depth of fluid bed, the timer 88 actuates valve 84 through differential pressure controller 86 to stop the flow of catalyst to the regenerator 70. A period during which there is substantially no flow between the reactor 68 and regenerator 70 may follow the transfer of catalyst to the regenerator, or the valve 84 can be operated by differential pressure controller 86 and timer 88 to increase the pressure on the regenerator 70 and begin a flow of catalyst from the regenerator 70, under inner shell 66 and up into the reactor 68.

The hydrodesulfurization of the residual oil continues in reactor 68 without interruption while the catalyst is transferred between the reactor 68 and regenerator 70 as well as during the time between transfer periods. Similarly, oxygen-containing gas is continually introduced into the regenerator 70 through line 92 for combustion of the carbon deposited on the catalyst at a temperature of approximately 800 to 1300° F. The catalyst transferred between the reactor 68 and regenerator 70 is stripped of occluded materials by means of stripping gas introduced through line 94.

Figure 3:
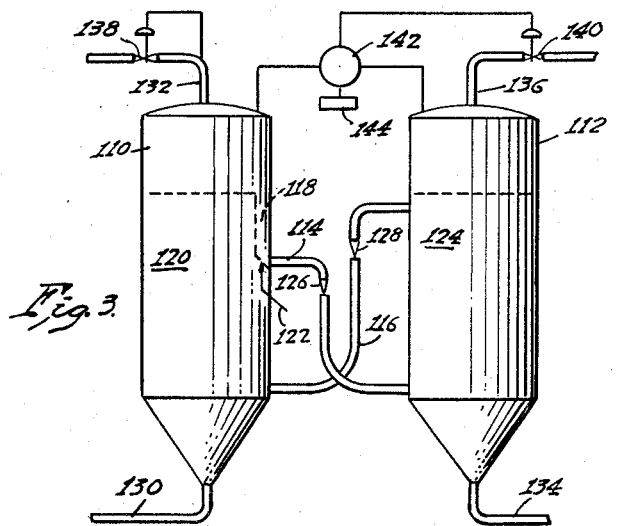
Figure 3 is a diagrammatic illustration of still another embodiment of this invention employing separate transfer lines for movement of the solid particles in each direction.

An embodiment of this invention employing two transfer lines for the movement of the catalyst is illustrated in Figure 3. A first reactor 110 and a second reactor 112 are connected by a pair of transfer lines 114 and 116. Transfer line 114 is adapted to deliver fluidized particles withdrawn from the upper part of the first reactor 110 to the lower part of the second reactor 112. This may be accomplished by line 114 opening into a well 118 in reactor 110 adapted to withdraw solid particles from the upper part of a fluid bed 120, as illustrated, or the line 114 opening directly into the upper portion of the fluid bed 120. A stripping gas is introduced into well 118 through a line 122. The transfer line 116 extends from the upper portion of the second reactor 112, below the upper surface of a fluid bed 124 in that reactor, to the lower part of reactor 110.

A one-way valve 126 in transfer line 114 permits flow only from first reactor 110 to the second reactor 112 through line 114. A similar one-way valve 128 in line 116 permits flow through that line from second reactor 112 to first reactor 110.

The first reactor 110 is provided with an inlet line 130 for the introduction of reactants and an outlet line 132 for discharging reaction products. The second reactor 112 has an inlet line 134 at its lower end and an outlet line 136 at its upper end. Control of the pressure differential between the two reactors is obtained by control valves 138 and 140 in outlet lines 132 and 136, respectively, a pressure differential controller 142 connected to control valve 140 and a timer 144. Operation of the pressure differential control is similar to the operation described in connection with Figures 1 and 2.

The operation of the apparatus is believed to be self-apparent. When the pressure in reactor 110 is higher than the pressure in reactor 112, fluidized solid particles flow down through well 118, through valve 126 and line 114 to the lower part of reactor 124. Flow through transfer line 116 is prevented by one-way valve 128. When the direction of the pressure differential is reversed, the fluidized solids flow from the upper portion of fluid bed 124 in reactor 112 to the lower part of reactor 110 through line 116. Flow from reactor 112 to reactor 110 through line 114 is prevented by one-way valve 126. Thus, the embodiment of this invention aids the turbulence of the fluid beds in mixing the solid particles transferred with the main portion of the fluid bed by withdrawing catalyst from the upper portion of one fluid bed and delivering it to the lower portion of the other fluid bed, thereby insuring circulation of the solid particles.

In this invention the fluidized solid particles are transferred alternately from one vessel to the other. While the flow of the fluidized particles is of an intermittent nature, the reactions in the two vessels may proceed continuously. The highly turbulent condition within the fluidized bed at ascending gas rates ordinarily employed and the transfer of only a small fraction of the total volume of particles in each transfer permits the maintenance of a uniform temperature and average condition of the solid particles throughout the reaction vessels.

In this invention, flow of the fluidized solid particles is cyclical in that the particles are transferred from one vessel to another and then back. However, at any one instant there is flow in only one direction. Since the fluidized particles flow only in one direction at any one time, difficulties commonly encountered in transferring the particles from one vessel to a vessel under a higher pressure are avoided.

While the processes have been described in terms of reaction periods in the vessels followed by transfer periods, in order to facilitate and clarify the description, the processes are not so limited. The transfer of solid particles in one direction or the other may be proceeding practically continuously while the reactions in the vessels proceed without interruption.

I claim:

1. A process for the transfer of fluidized solid particles through a single transfer line between fluid beds in each of two reaction vessels, said fluidized solid particles being subjected to different reaction conditions in the two vessels, comprising maintaining the single transfer line open between and into the fluid beds in the two vessels, maintaining a dense phase of fluidized solid particles in each vessel above the opening of the transfer line into the respective opening, periodically changing the direction of the pressure drop between the two vessels whereby a dense phase of fluidized solid particles moves first in one direction and then in the other through the transfer line, and periodically repeating the changing of the direction of the pressure differential to cause cyclical flow between the two reaction vessels.

2. A process as set forth in claim 1 in which the solid particles are stripped with an inert gas prior to entering the transfer line from a reaction vessel.

3. In a fluidized process in which finely divided solid particles are suspended in a fluidized dense phase by a gaseous phase in each of two reaction vessels, are subjected to different reaction conditions in the two reaction vessels, and are transferred cyclically from one vessel to the other, the improvement comprising maintaining a transfer line between the two reactors continuously open into the dense phase in each of the reactors, periodically changing the direction of the pressure differential between the two vessels to cause flow of fluidized solid particles through the transfer line first in one direction from one vessel to the other and then in the opposite direction, and deflecting bubbles of the gaseous phase in the reaction vessels from entrance into the transfer line.

4. In a process in which a fluidized dense phase of solid particles is suspended in a gaseous phase in each of two reaction vessels and the solid particles are transferred alternately from one vessel to the other for contact with one reactant in one vessel and a different reactant in the other vessel, the improvement comprising maintaining a transfer line continuously open between the two vessels and into the dense phase in the two vessels, introducing an inert gas into each of the vessels below the opening of the transfer line into each of the vessels, introducing reactants into the respective vessels above the opening of the transfer line into the vessels, and periodically changing the direction of the pressure differential between the two vessels to move the solid particles in a dense phase through the transfer line alternately in one direction and then the other.

5. In high pressure processes in which fluidized solid particles are moved cyclically between one reaction vessel in which the solid particles are subjected to reaction conditions and a second reaction vessel in which the solid particles are subjected to different reaction conditions, the difference in pressure in the two reaction vessels being small relative to the total pressure on the vessels, a process for transferring the solid particles from one vessel to the other comprising maintaining a dense phase of fluidized solid particles in each of the reaction vessels, maintaining a transfer line open between the vessels and into the dense phase in each reactor, and alternating the pressure on one reaction vessel from above to below the pressure on the other reaction vessel to move the fluidized solid particles alternately in one direction through the transfer line from one reaction vessel to the other and then in the opposite direction to cause cyclical flow of the solid particles through the two reaction vessels.

6. A fluid catalytic process for the conversion of hydrocarbons comprising introducing a hydrocarbon charge stock into a reactor vessel, maintaining a fluidized dense phase of catalyst particles suspended in gaseous hydrocarbons in the reactor vessel to convert the hydrocarbon charge, maintaining a fluidized dense phase of catalyst particles suspended in an oxygen-containing gas in a regenerator vessel to regenerate the catalyst, introducing an oxygen-containing gas into the regenerator vessel, maintaining a transfer line open between the reactor vessel and regenerator vessel and into the dense phase in the reactor vessel and regenerator vessel, alternating the pressure on one of the vessels from a pressure above to a pressure below the pressure on the other vessel to move fluidized catalyst particles through the transfer line alternately from one vessel to the other, and passing an inert gas countercurrent to catalyst entering the transfer line to strip the catalyst entering the transfer line of entrained hydrocarbon and oxygen-containing gases.

7. A fluidized catalytic process for the hydrodesulfurization of hydrocarbons comprising introducing a sulfur-containing hydrocarbon charge into a reactor vessel, introducing hydrogen into the reactor vessel, maintaining a dense phase of finely divided hydrogenation catalyst in a fluidized state suspended in hydrogen and gaseous hydrocarbons in the reactor vessel, introducing an oxygen-containing gas into a regeneration vessel, maintaining a dense phase of finely divided hydrogenation catalyst in a fluidized state suspended in the oxygen-containing gas in the regeneration vessel, maintaining a transfer line open between the two vessels and open into the dense phase in the two vessels, alternating the pressure of one vessel from a pressure below to a pressure above the pressure in the other vessel to move fluidized catalyst in a dense phase alternately from one vessel in one direction through the transfer line to the other vessel and then in the opposite direction, and passing an inert gas countercurrent to catalyst entering the transfer line to strip entrained gases therefrom.

8. In a fluidized process in which a dense phase of fluidized solid particles is subjected to one set of operating conditions in a fluidized bed in a first reaction vessel and a different set of operating conditions in a fluidized bed in a second reaction vessel and the fluidized solid particles are transferred in a cyclical manner between the two reaction vessels whereby the fluidized solid particles are exposed alternately to the conditions in one reaction vessel and then to the conditions in the other reaction vessel, the improved method of transferring the solid particles from one vessel to the other comprising maintaining a passage open between the fluidized beds in the two reaction vessels, maintaining one of the vessels at one pressure and the other vessel at a different pressure to provide a pressure differential causing flow of a dense phase of solid particles from the vessel at the higher pressure through the passage into the vessel at the lower pressure, and periodically changing the pressure on at least one of the reaction vessels to reverse the direction of the pressure differential and the direction of flow of the dense phase of solid particles between the two reaction vessels.

9. A process for circulating fluidized solid particles cyclically between a fluidized bed in a first reaction vessel in which the fluidized particles are subjected to one set of reaction conditions and a fluidized bed in a second reaction vessel in which the fluidized particles are subjected to a different set of reaction conditions comprising maintaining the pressure on the first reaction vessel higher than the pressure on the second reaction vessel, withdrawing a dense phase of solid particles from the upper portion of the fluidized bed in the first reaction vessel and introducing it into the lower portion of the second reaction vessel while the first reaction vessel is at a higher pressure than the second reaction vessel, then reducing the pressure on the first reaction vessel to a pressure lower than the pressure on the second reaction vessel, withdrawing a dense phase of fluidized solid particles from the upper portion of the fluidized bed in the second reaction vessel and introducing it into the lower portion of the first reaction vessel while the second reaction vessel is at a higher pressure than the first reaction vessel, and periodically reversing the direction of the pressure differential between the two reaction vessels whereby a dense phase of solid particles is transferred alternately from the first reaction vessel to the second reaction vessel and then from the second reaction vessel to the first.

10. In a process for the manufacture of water gas in which steam is passed upwardly through a fluid bed of carbonaceous particles in a reactor at an elevated temperature to react with the carbonaceous particles to form carbon monoxide and hydrogen, air is passed upwardly through a fluid bed of fluidized carbonaceous particles in a heater at elevated temperatures to burn a portion of the carbonaceous particles and thereby supply heat to the particles, and the carbonaceous particles are transferred cyclically between the heater and the reactor whereby heat for the water gas reaction is supplied to the reactor, an improved process for transferring carbonaceous particles between the heater and the reactor comprising maintaining a line open between the fluid bed in the reactor and the fluid bed in the heater, maintaining a pressure differential between the heater and the reactor whereby a dense phase of fluidized carbonaceous particles is transferred between the heater and reactor, and periodically reversing the direction of the pressure differential to cause a dense phase of carbonaceous particles to flow alternately from the heater to the reactor and then from the reactor to the heater.

11. A process for the cyclical transfer of fluidized solid particles between two reaction vessels in which a dense phase fluid bed of solid particles is maintained in each of the reaction vessels for contact with different reactant gases in the two reaction vessels and a passage extends from one reaction vessel to the other and opens into the fluid beds in the two reaction vessels, comprising maintaining the pressure on one of the reaction vessels higher than the pressure on the other reaction vessel to cause flow of fluidized solid particles from the reaction vessel at the higher pressure through the passage to the reaction vessel at the lower pressure, and periodically changing the pressure on at least one of the reaction vessels to change the direction of the difference in pressure between the two vessels and thereby cause flow of fluidized solid particles in a dense phase alternately from one vessel to the other, there being flow of solid particles between the vessels in only one direction at any instant.

References Cited in the file of this patent

UNITED STATES PATENTS

| | | |
|---|---|---|
| 2,377,657 | Watts | June 5, 1945 |
| 2,377,935 | Gunness | June 12, 1945 |
| 2,414,852 | Burnside et al. | Jan. 28, 1947 |
| 2,420,129 | Flock | May 6, 1947 |
| 2,464,812 | Johnson | Mar. 22, 1949 |
| 2,557,680 | Odell | June 19, 1951 |
| 2,560,356 | Liedholm | July 10, 1951 |
| 2,584,378 | Beam | Feb. 5, 1952 |
| 2,601,676 | Trainer | June 24, 1952 |
| 2,604,436 | Adey et al. | July 22, 1952 |